(12) United States Patent
Jokinen

(10) Patent No.: US 8,107,433 B2
(45) Date of Patent: Jan. 31, 2012

(54) CHANGING LTE SPECIFIC ANCHOR WITH SIMPLE TUNNEL SWITCHING

(75) Inventor: Joanna Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 11/812,263

(22) Filed: Jun. 15, 2007

(65) Prior Publication Data
US 2008/0031159 A1 Feb. 7, 2008

Related U.S. Application Data

(60) Provisional application No. 60/814,042, filed on Jun. 16, 2006.

(51) Int. Cl.
*H04W 4/00* (2009.01)

(52) U.S. Cl. ........ 370/331; 370/254; 370/255; 370/328; 370/332; 370/352; 455/410; 455/436; 455/435.1; 455/439; 455/450

(58) Field of Classification Search ................. None
See application file for complete search history.

(56) References Cited

U.S. PATENT DOCUMENTS

| | | | | |
|---|---|---|---|---|
| 2006/0056365 A1* | 3/2006 | Das et al. | ...... | 370/338 |
| 2007/0213060 A1* | 9/2007 | Shaheen | ...... | 455/436 |
| 2007/0248064 A1* | 10/2007 | Shaheen | ...... | 370/338 |
| 2008/0013553 A1* | 1/2008 | Shaheen | ...... | 370/401 |

FOREIGN PATENT DOCUMENTS

| | | |
|---|---|---|
| EP | 1 592 275 A1 | 11/2005 |
| EP | 1592275 A1 * | 11/2005 |

OTHER PUBLICATIONS

3 GPP TR 23.882 V1.2.3, "*3rd Generation Partnership; Technical Specification Group and System Aspects; 3GPP System Architecture Evolution: Report on Technical Options and Conclusions (Release 7)*", Jun. 2006, pp. 1-54.
3GPP TSG SA WG2 Architecture-S2#50, *MME, UPE and Inter-AS Anchor in the Evolved Architecture*, Jan. 2006, pp. 1-5.
3GPP TSG-RAN WG3 meeting #51bis, "*AGW Relocation in LTE_Active*", Apr. 2006, pp. 1-.
3GPP TSG-RAN WG3 #51-bis meeting, "*Relocation of AGW for LTE_Active UEs*", Apr. 2006, pp. 1-7.
3GPP TR 23.882 V1.9.0 fD.3.5, "*3rd Generation Partnership Project; Technical Specification Group Services and System Aspects; 3GPP System Architecture Evolution: Report on Technical Options and Conclusions (Release 7)*", Mar. 2007, pp. 1-9 and pp. 160-182.
International search report PCT/IB2007/001619 filed Jun. 15, 2007.

* cited by examiner

*Primary Examiner* — Hassan Phillips
*Assistant Examiner* — Ajay Cattungal
(74) *Attorney, Agent, or Firm* — Mintz, Levin, Cohn, Ferris, Glovsky and Popeo, P.C.

(57) ABSTRACT

Embodiments of the invention may further provide a method for transferring an LTE anchor in an idle mode. The method includes an MME (control plane entity) initiating an LTE anchor change procedure, the MME first commands the selected new LTE anchor to set up a user plane tunnel towards the 3GPP anchor and then it updates this information towards the 3GPP anchor. Thereafter, the old tunnel is deleted from the old LTE anchor.

22 Claims, 15 Drawing Sheets

CHANGING LTE SPECIFIC ANCHOR WITH SIMPLE TUNNEL SWITCHING

CROSS-REFERENCES TO RELATED APPLICATIONS

This application claims priority of U.S. Provisional Patent Application Ser. No. 60/814,042, filed on Jun. 16, 2006. The subject matter of the above referenced application is incorporated by reference.

BACKGROUND OF THE INVENTION

1. Field of the Invention

The present invention relates to long term evolution (LTE) anchor mobility and transferring of LTE anchors when in an idle state.

2. Description of the Related Art

In the 3rd Generation Partnership Project (3GPP), the evolution from the existing General Packet Radio Service (GPRS) network architecture is being studied under the name of System Architecture Evolution (SAE) in order to enhance the capability of the 3GPP system to cope with the rapid growth in Internet Protocol data traffic. SAE is envisioned to accommodate various types of access systems, such as 3GPP access systems and WLAN, and it supports seamless mobility within and across those access systems. As one of the 3GPP access systems, a new radio access system called Long Term Evolution (LTE) is being standardized. A goal of SAE standardization is to accommodate LTE access and provide higher bit rate packet services with seamless mobility capability.

An LTE anchor provides mobility anchor functionality when a user equipment moves from one user plane entity area to another. The LTE anchor is the user plane entity closest to the radio access network (RAN). The LTE anchor terminates packet data convergence protocol (PDCP) and user plane ciphering/integrity protection for LTE access. However, in the 3GPP architecture, it is not specified how the mobility of user plane functions may be accomplished, or further, which functional entities can be changed or relocated when the user is in an idle state or in an active mode. One such functional entity change that is not specified in 3GPP architecture is the LTE anchor change-over or mobility, which is a critical component to the operation of the developing architecture.

One motivation for an LTE specific anchor change-over could be route optimization, for example, if an earlier selected LTE specific anchor is no longer in an optimal path as a result of user mobility. Another motivation for LTE specific anchor change-over may be a failure in the current LTE anchor requiring a transition to substitute for the failing component. Other motivations for LTE specific anchor change-over may be network congestion in the data path to/from the current LTE anchor or a desire to share load more evenly in the network across other LTE anchors. Thus, LTE anchor mobility has a substantial impact on the 3GPP architecture and there is a need to address the LTE anchor mobility issue if the architecture is to be successful.

SUMMARY OF THE INVENTION

An embodiment of the invention generally provides a method for LTE anchor mobility. The present invention can provide anchor mobility in a simple, low cost, and uncomplicated solution, through a simple tunnel switching method in idle mode. Embodiments of the LTE anchor mobility method are based on the MME role as an idle mode controlling element, thus having the information needed for simple tunnel switching between two LTE anchor points. In embodiments of the invention, the 3GPP anchor generally remains the same when LTE anchor changes.

Embodiments of the invention may further provide a method for transferring an LTE anchor in an idle mode. The method includes an MME (control plane entity) initiating an LTE anchor change procedure, the MME first commands the selected new LTE anchor to set up a user plane tunnel towards the 3GPP anchor and then it updates this information towards the 3GPP anchor. Thereafter, the old tunnel is deleted from the old LTE anchor.

Another embodiment of the invention is directed to a network entity for initiating an anchor change-over procedure. The network entity includes a creation unit configured to direct a creation request to a second anchor to set up a user plane tunnel towards a third generation anchor and configured to receive a response from the second anchor. The network entity also includes an updating unit configured to send an update context request towards the third generation anchor and to receive an update proxy context response from the third generation anchor. The network entity further includes a deletion unit configured to direct a deletion request to a first anchor and to receive a deletion response from the first anchor. The network entity is configured to operate in an idle mode.

Another embodiment of the invention is directed to a method for initiating an anchor change-over procedure. The method includes directing a creation request to a second anchor to set up a user plane tunnel towards a third generation anchor, receiving a response from the second anchor and sending an update context request towards the third generation anchor. The method also includes receiving an update proxy context response from the third generation anchor, directing a deletion request to a first anchor and receiving a deletion response from the first anchor. A network entity implementing the elements above is configured to operate in an idle mode.

Another embodiment of the invention is directed to an apparatus for initiating an anchor change-over procedure. The apparatus includes directing means for directing a creation request to a second anchor to set up a user plane tunnel towards a third generation anchor. The apparatus also includes receiving means for receiving a response from the second anchor, updating means for sending an update context request towards the third generation anchor and receiving means for receiving an update proxy context response from the third generation anchor. The apparatus further includes directing means for direction a deletion request to a first anchor and receiving means for receiving a deletion response from the first anchor. The apparatus is in an idle mode.

Another embodiment of the invention is directed to a system for implementing initiation of an anchor change-over procedure. The system includes a mobility entity configured to direct a creation request to a second anchor to set up a user plane tunnel towards a third generation anchor. The system also includes the second anchor configured to create a tunnel towards the third generation anchor upon receipt of the creation request and to send a response to the mobility entity. Upon receipt of the response from the second anchor the mobility entity is configured to update a context request towards the third generation anchor. The third generation anchor is configured to update uplink path toward the second anchor and to send an update proxy context response to the mobility entity. The mobility entity is configure to directing a deletion request to a first anchor and to receive a deletion response from the first anchor. The mobility entity is configured to operate in an idle mode.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
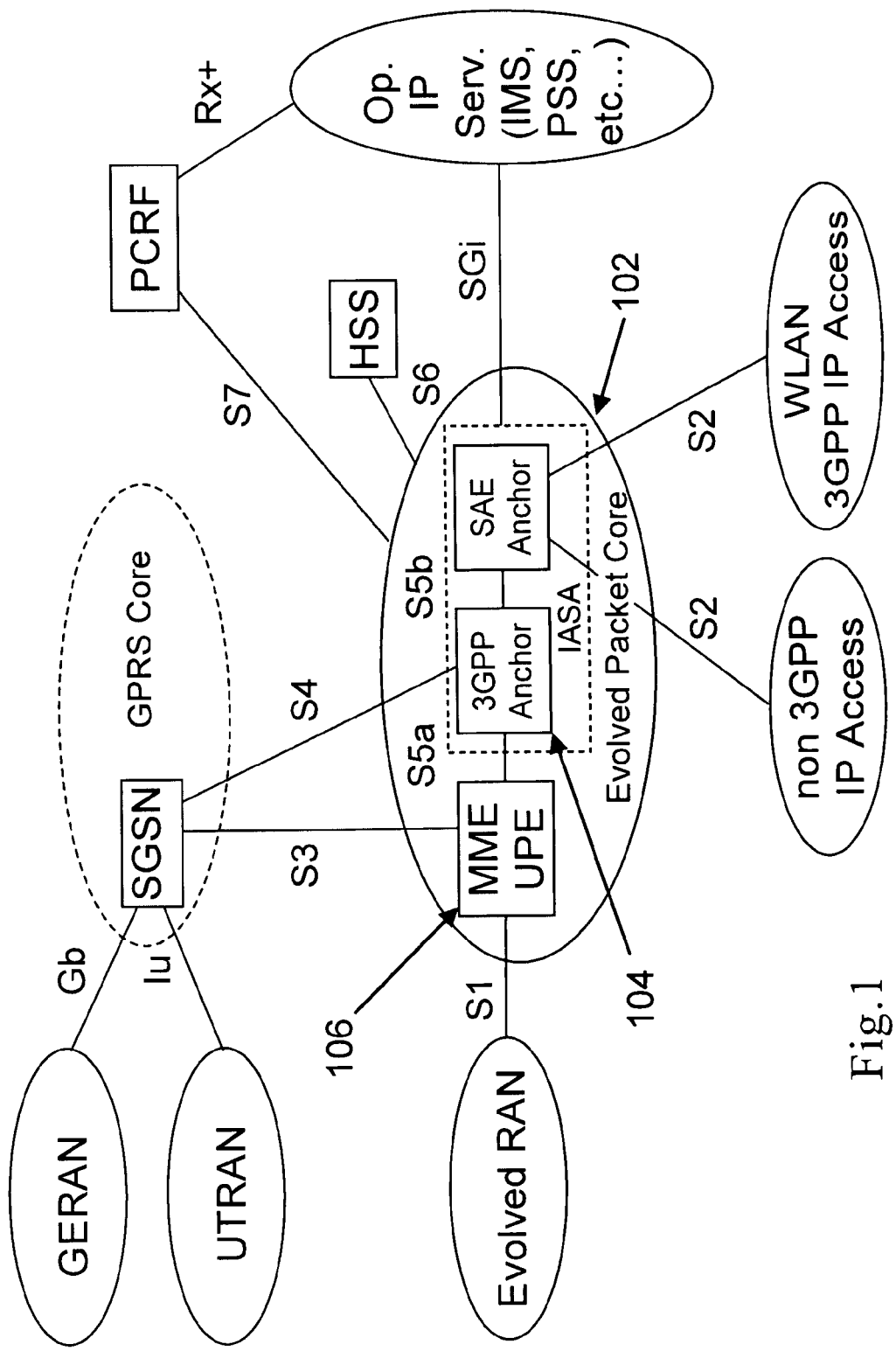
FIG. 1 illustrates an exemplary system architecture of the invention.

FIG. 1 illustrates an exemplary system architecture in which embodiments of the invention may be implemented. In 3GPP SAE/LTE, the supporting architecture is currently being developed. The different functionalities of the user plane side of the supporting architecture are shown in FIG. 1. The system architecture evolution (SAE) anchor 102 and the 3GPP anchor 104 are each shown in the dashed line box and are in communication with the MME UPE 106, which is collectively referred to as the evolved packet core. The core network to radio access network for transport of user plane and control plane traffic is illustrated as S1, that is, the communication link between the MME UPE and the Evolved RAN. The non-3GPP-access-network, for example, Wireless LAN, to core network for user plane control and mobility support is illustrated as S2, that is, the connection between the SAE anchor 102 and the WLAN or non-3GPP IP access component.

The general packet radio service core (GPRS-core) connection to the evolved packet core network for user and bearer information exchange during idle and/or active states is illustrated as S3. The GPRS-core connection to the evolved packet core network for mobility support is illustrated as S4. The GPRS-core is also connected to GMS/EDGE Radio Access Network (GERAN) by a Gb interface and to a UTMS Terrestrial Radio Access Network (UTRAN) by a 1 u interface. The Mobility Management Entity/User Plane Entity connection to the Inter-access-system anchor for user plane control and mobility support is illustrated as S5a, and 3GPP anchor connection to SAE anchor as S5b. The Home Subscriber Server connection to the evolved packet core network, which is generally used to transfer subscriber data for authentication and authorization, is illustrated as S6. The Policy and Charging Rule Function (PCRF) connection to the Policy and Charging Enforcement Point for transfer of quality of service and charging rules is illustrated as S7. PCRF is also connected to Operational IP Services by an Rx+ interface and the Operational IP Services is connected to the evolved packet core by a SGi interface.

Figure 2:
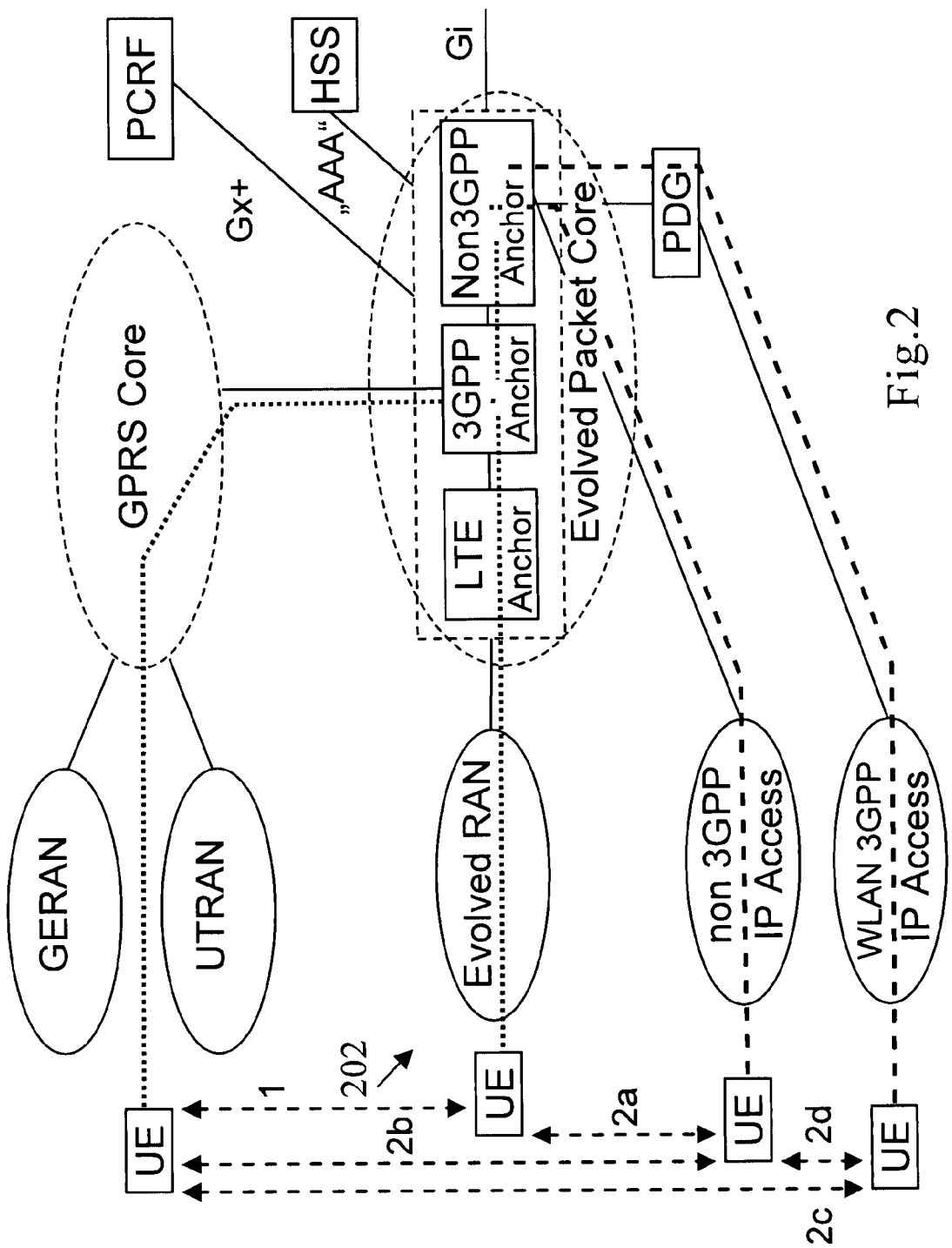
FIG. 2 illustrates an exemplary system architecture of the invention including the user equipments communicating with the system architecture and the mobile LTE anchor.

FIG. 2 illustrates an exemplary system architecture of the invention including the user equipments communicating with the system architecture and the mobile LTE anchor. The LTE anchor 202 communicates with the 3GPP anchor. Thus, the LTE anchor 202 is generally the user plane entity on the Core Network side closest to the evolved RAN, and operates to terminate PDCP and user plane ciphering/integrity protection for LTE access. The termination point currently agreed in 3GPP is to reside on core network.

In the exemplary system architecture of FIG. 2, the user plane mobility is considered independently of the control plane, even though both can be triggered by user mobility to a new base station. Therefore, there are generally three possible anchor points. First, the LTE specific anchor, which operates to terminate ciphering, integrity protection, and PDCP for LTE access. The second is the 3GPP anchor, which is used for switching the user plane between the defined 3GPP accesses. The third is the global mobility anchor (the non-3GPP anchor), which is used for switching the user plane between the 3GPP and non-3GPP accesses, for example, using MIP and HA.

Figure 3:
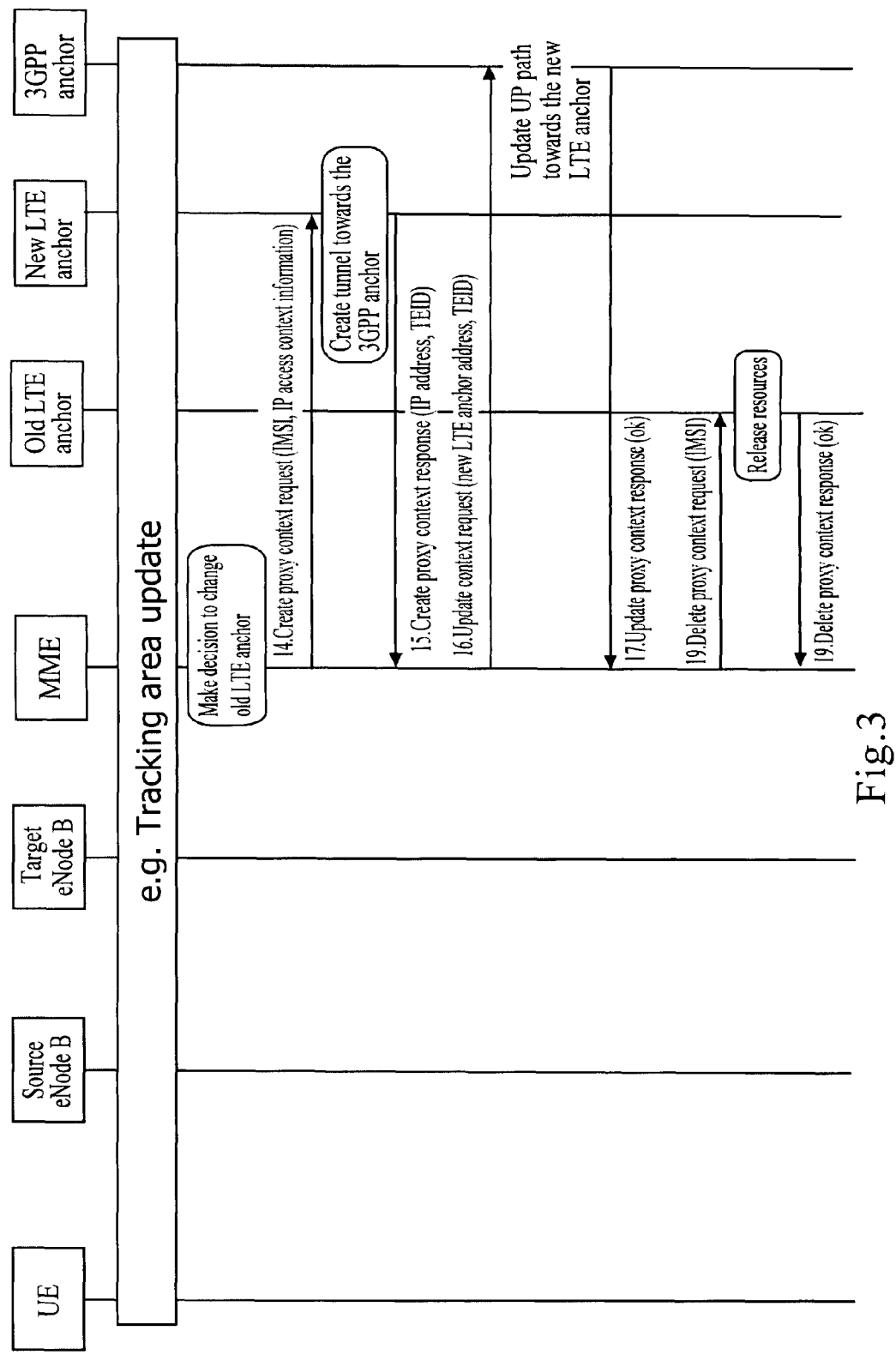
FIG. 3 illustrates an exemplary simplified implementation of the anchor mobility method of the invention.

FIG. 3 illustrates an exemplary simplified implementation of the anchor mobility method of the invention. In the exemplary method, the Mobility Management Entity (MME)/(control plane entity) initiates an LTE anchor change procedure. The MME can utilize an external server for decision making about the time and the new LTE anchor to be selected. The MME first commands the selected new LTE anchor to set up a user plane tunnel towards the 3GPP anchor. After it receives tunnel endpoint data from the new LTE anchor, it updates this information towards the 3GPP anchor. After that, the old tunnel can be deleted from the old LTE anchor. In this embodiment of the invention, it is assumed that when the MME is in idle mode it already knows user plane information, including the security information, and it does not have to request this information from the old LTE anchor before commanding the LTE anchor change. It should be noted that this assumption is made because the user equipment is at the moment in idle mode and it does not thus have any active bearer set up towards the radio access network.

More particularly, the exemplary method may include the MME creating and sending a proxy context request to the new LTE anchor, as Step 14 of FIG. 2. The proxy context request may include International Mobile Station Identity (IMSI) information and IP access context information, among others. The request operates to command the new LTE anchor to create a tunnel towards the 3GPP anchor, that is, to prepare to tunneling behavior as a proxy element between the base station and 3GPP anchor (when the user equipment moves to active mode for data delivery). The new LTE anchor responds with the create proxy context response that may include the new LTE anchor address(es) for user plane delivery, and allocated Tunnel Endpoint Identifiers (TEID), at Step 15. At step 16, the MME sends an update context request to the 3GPP anchor. The update context request includes the new LTE anchor address(es) and the TEID(s) received from the new LTE anchor. This request operates to instruct the 3GPP anchor to update the user plane path(s) towards the new LTE anchor. In response, the 3GPP anchor sends a message back to the MME indicating that the update is OK, at Step 17. Thereafter, at step 19, the MME sends a delete proxy context request (IMSI) to the old LTE anchor to terminate operations with the old LTE anchor. The old LTE anchor, in response to the request, releases the resources needed to transfer to the 3GPP anchor. At step 19 of the exemplary method, the old LTE anchor sends a delete proxy context response acknowledgement to the MME, which finalizes the transition of the LTE anchor point from the old LTE anchor to the new LTE anchor.

An advantage of the exemplary embodiment of the invention is the simplicity of the operational steps required to transition from an old LTE anchor to a new LTE anchor. For example, in the exemplary embodiment, only dialog messages and responses are needed to establish a new tunnel endpoint (or multiple in case there are several bearers for that user equipment) from a new LTE anchor point. Further, since the invention is primarily directed to conducting LTE anchor changes in idle mode, complex PDCP endpoint relocation is not required. Also, by using idle mode for the transition, tunnel updates towards the base station (BS) are not needed, as no data tunnels exist then between LTE anchor and BS in the idle mode.

Figure 4:
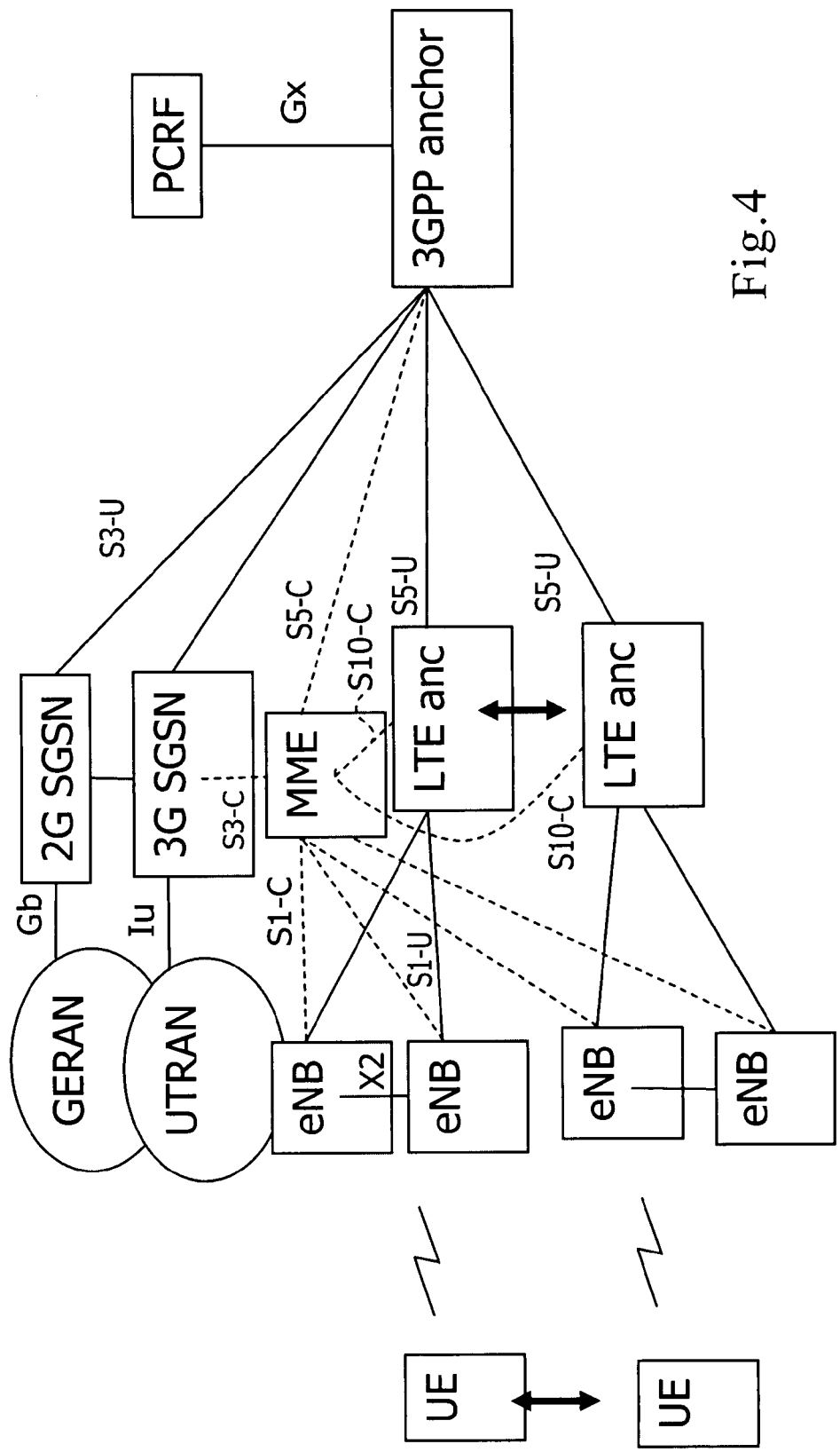
FIG. 4 illustrates a diagram of an exemplary LTE anchor mobility configuration.

Returning to the basic configuration and system layout of the invention, FIG. 4 illustrates a diagram of an exemplary LTE anchor mobility configuration. In the exemplary anchor configuration, the X2 interface (the eNB-eNB interface) is used for signaling as well as for data forwarding. The system layout illustrates that an advantage of the present invention is that it significantly improves load sharing for LTE specific anchors and improves LTE anchor failure or congestion. For example, embodiments of the invention do not generally consider a case where a base station, after handoff, is not able to communicate with the old LTE anchor. Embodiments of the invention are generally directed to avoiding longer delays in the situation, for example, where, due to user equipment mobility, the currently selected LTE anchor is situated in a non-optimal path in the network topology so that a more optimal user plane route is achieved by using another LTE anchor.

The process of LTE anchor change is generally conducted in the idle mode. However, active mode changeovers are possible and would generally be triggered by a base station change. The base station is the node initiating the LTE anchor change-over, and the process of the changeover will generally require a PDCP endpoint relocation from the old LTE anchor to the new LTE anchor. For this process to be efficient, at least one control plane interface between the respective LTE anchors is necessary. The user plane forwarding interface could be required, and similar principles for base station handover would need to be applied. Additionally, buffering is required at the new LTE anchor until it receives the PDCP/ciphering information (sequence numbers) at which point the old LTE anchor is finished. Further, for lossless delivery, data forwarding between the LTE anchors would also be a requirement. Thus, it is apparent that the LTE anchor transition, although possible in active mode, is much less complicated if conducted in the idle mode, as illustrated in the method of FIG. 3. For example, by switching LTE anchors in an idle mode, the process may be triggered by the tracking area update. Generally the MME is the initiating node, and the base station is generally not capable of initiating a changeover while in an idle mode and the MME can utilize an external service to make the decision change. Further, by conducting the LTE anchor changeover in an idle mode, the PDCP endpoint move is simplified, and no bearers are active toward the RAN, as a simple tunnel switching via the MME accomplishes the changeover.

Figure 5A:
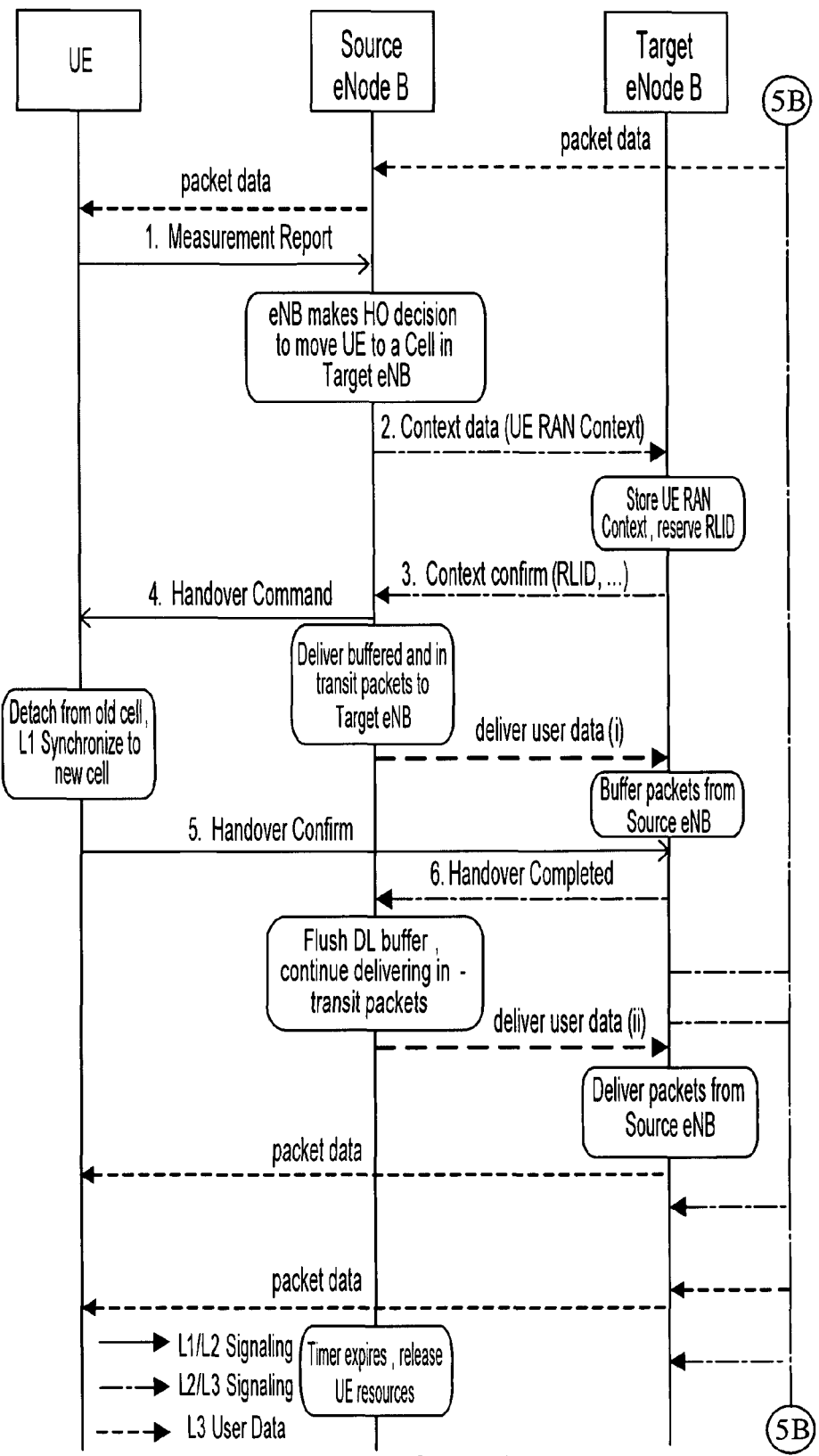
FIGS. 5A and 5B illustrate a flowchart of an exemplary anchor mobility method of the invention in a roaming case.
Figure 5B:
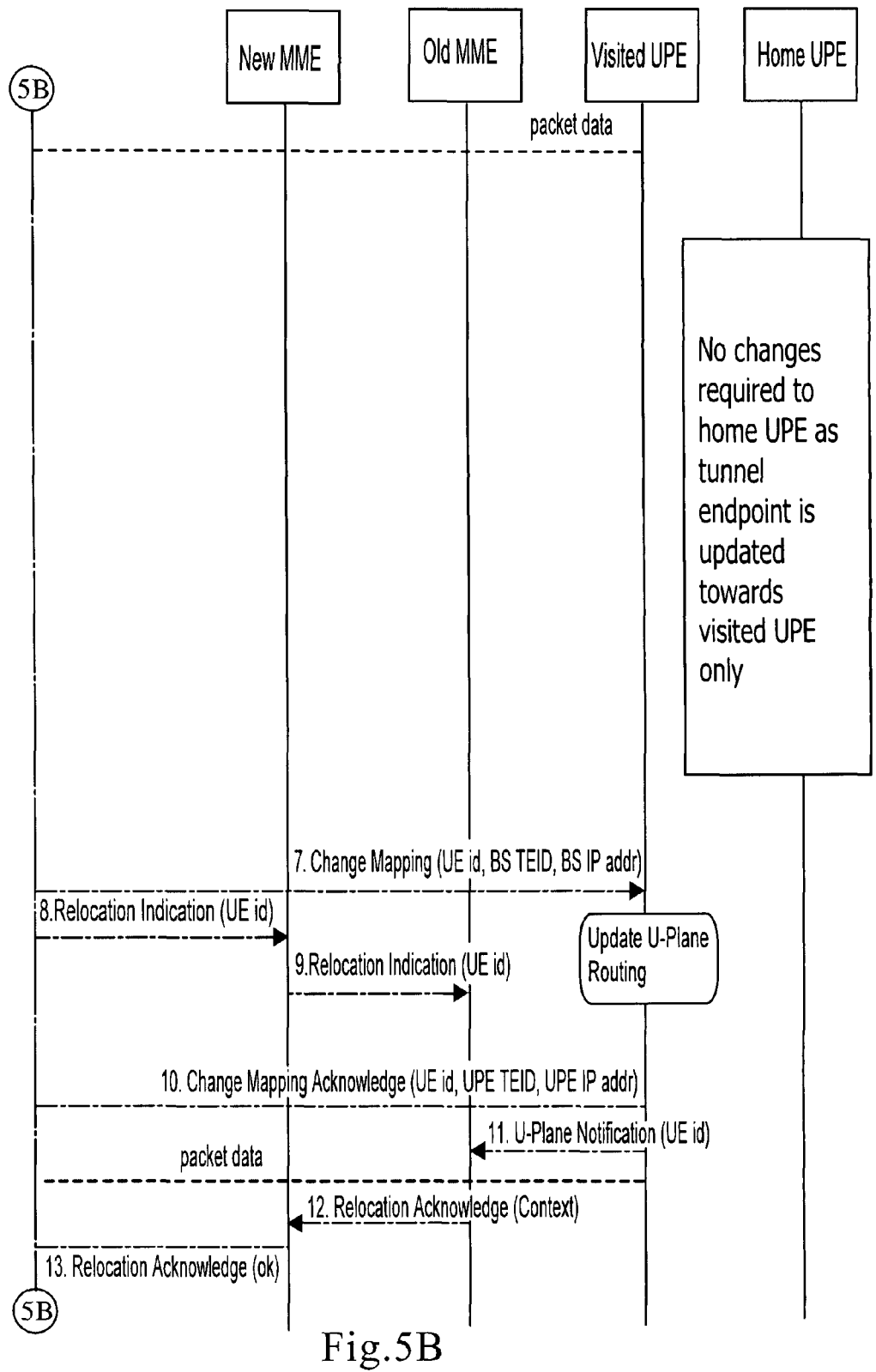

FIGS. 5A and 5B illustrate a flowchart of an exemplary anchor mobility embodiment of the invention in a roaming case. In the embodiment illustrated in FIGS. 5A and 5B, there will be no observed changes to signaling in the handover. The visiting user plane entity (UPE) is updated with the new base station (BS) information, but the home UPE does not see the change at all. For example, at Step 1 in FIGS. 5A and 5B, a measurement report is sent to the Source eNode B from the user equipment in an L1/L2 signaling process. The eNode B (eNB) makes the handoff decision to move the user equipment to a cell in the target eNB. Then, at Step 2, the eNB sends a context data (user equipment RAN context) message to the Target eNB in an L2/L3 signaling process. The target eNode B stores the UE RAN context and reserves the RLID, and then sends a context confirm message back to the Source eNB in an L2/L3 signaling process, at Step 3. Thereafter, the source eNB sends an handover command to the user equipment, which then detaches from the old cell and synchronizes to the new cell at Step 4. The user equipment then sends a handover confirm message to the Target eNB at Step 5. At this stage, the buffered data in transit is sent from the Source eNB to the Target eNB, and the Target eNB sends a handover complete message to the Source eNB at Step 6. The Source eNB may then flush the DL buffer and finalize delivery of any in transit packets that were buffered.

At Step 7 of the exemplary roaming embodiment, the Target eNB sends a message to the visited UPE to change the mapping (UE ID, BS TEID, BS IP address, etc.), and the visited UPE updates the user plane routing in accordance with the message. At Step 8, the Target eNB sends a relocation indication to the new MME, which then forwards the relocation indication to the old MME, at Step 9. At Step 10, the visited UPE sends a mapping acknowledge message to the Target eNb and, at Step 11, sends a user plane notification to the old MME. At Step 12, the old MME sends a relocation acknowledge message to the new MME and the new MME forwards the relocation acknowledge message to the Target eNB, at step 13. At this point, all of the packet data travels to the user equipment through the Target eNB and the exemplary embodiment is completed without any changes being required to the HOME UPE, as the tunnel endpoint is updated only at the visited UPE.

In a roaming case where home services are used and the visited UPE is the same as the LTE anchor changed after the handover, the UPE selection in the initial setup is the core network and MME functionality. The MME is the natural element to detect the need for visited UPE change and to select a new visited UPE. The same procedures for a stand alone UPE may be used. Attempts to make the UPE equivalent to LTE anchor relocation with simple tunnel switching is generally not useful without making the proper PDCP endpoint relocation, as provided in the above noted embodiment.

Figure 6:
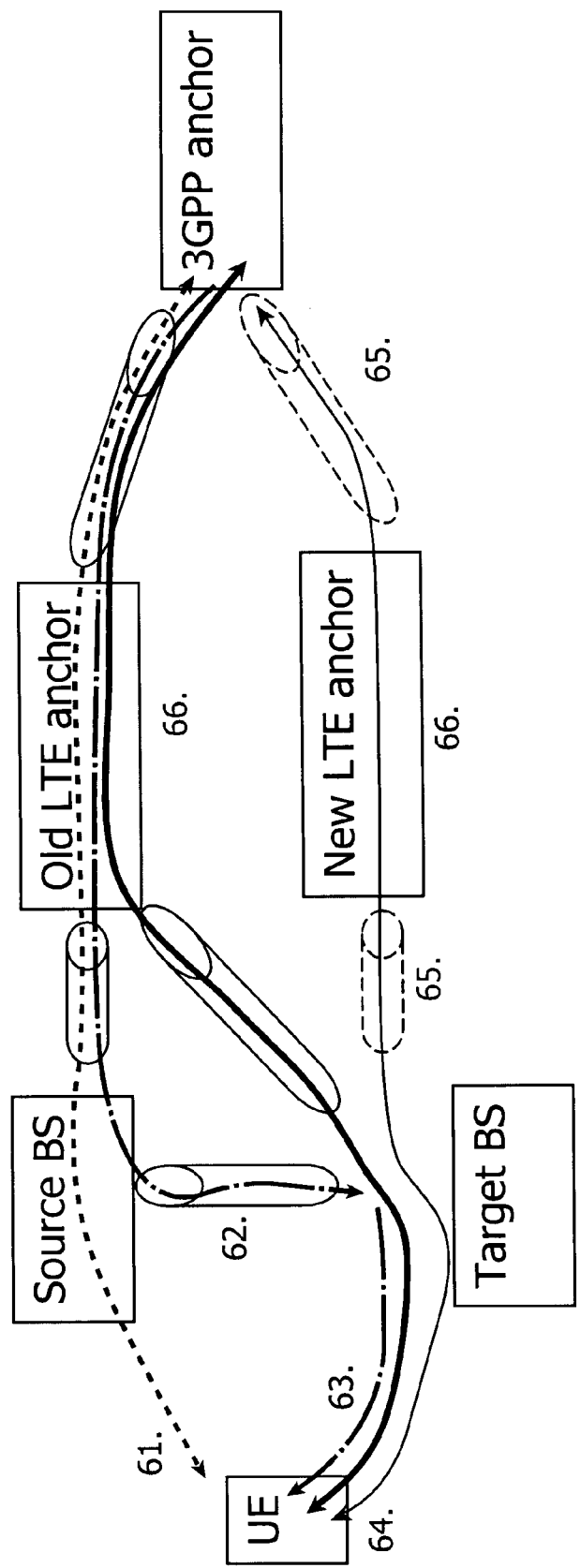
FIG. 6 illustrates a schematic for an exemplary inter-base station handover including an LTE anchor change.

FIG. 6 illustrates a schematic for an exemplary inter-base station handover including an LTE anchor change. The data path before the handover is illustrated as 61 and includes bi-directional communication between the 3GPP anchor, the old LTE anchor, the Source base station, and the user equipment. In the handover method, the Source base station starts forwarding downlink (DL) data toward the target base station, as illustrated by 62. A radio link is established and the target base station can send data via the new radio link towards the user equipment, as illustrated by 63. The data path is updated from the target base station to the old LTE anchor and data flows (uplink and downlink) via the new radio link via the target base station, as illustrated by 64. The MME first requests the new LTE anchor to setup tunnels towards the 3GPP anchor and the target base station at 65, and the new LTE anchor is ready to receive data. After the new LTE anchor is set up, MME requests (generally simultaneously) both target the base station and 3GPP anchor to update data paths towards the new LTE anchor, all of which takes place at step 65. Thereafter, at step 66 the MME requests that the old LTE anchor release the resources after a timer expires. The timer is set up such that the data already sent can be passed before the timer expires.

Figure 7A:
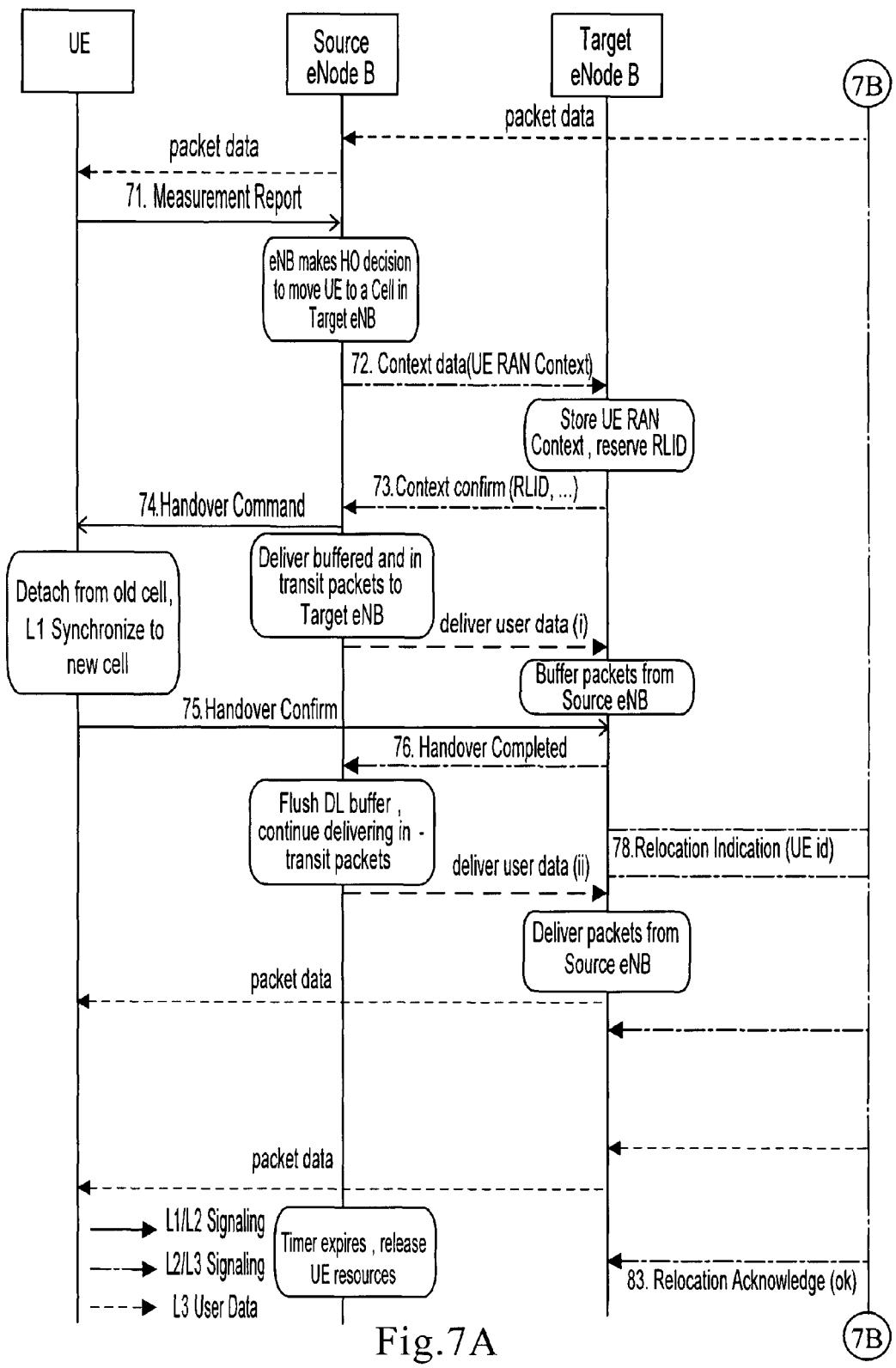
FIGS. 7A and 7B illustrate a flow chart of an exemplary method of inter MME handover with additions to enable UPE=LTE anchor handovers.
Figure 7B:
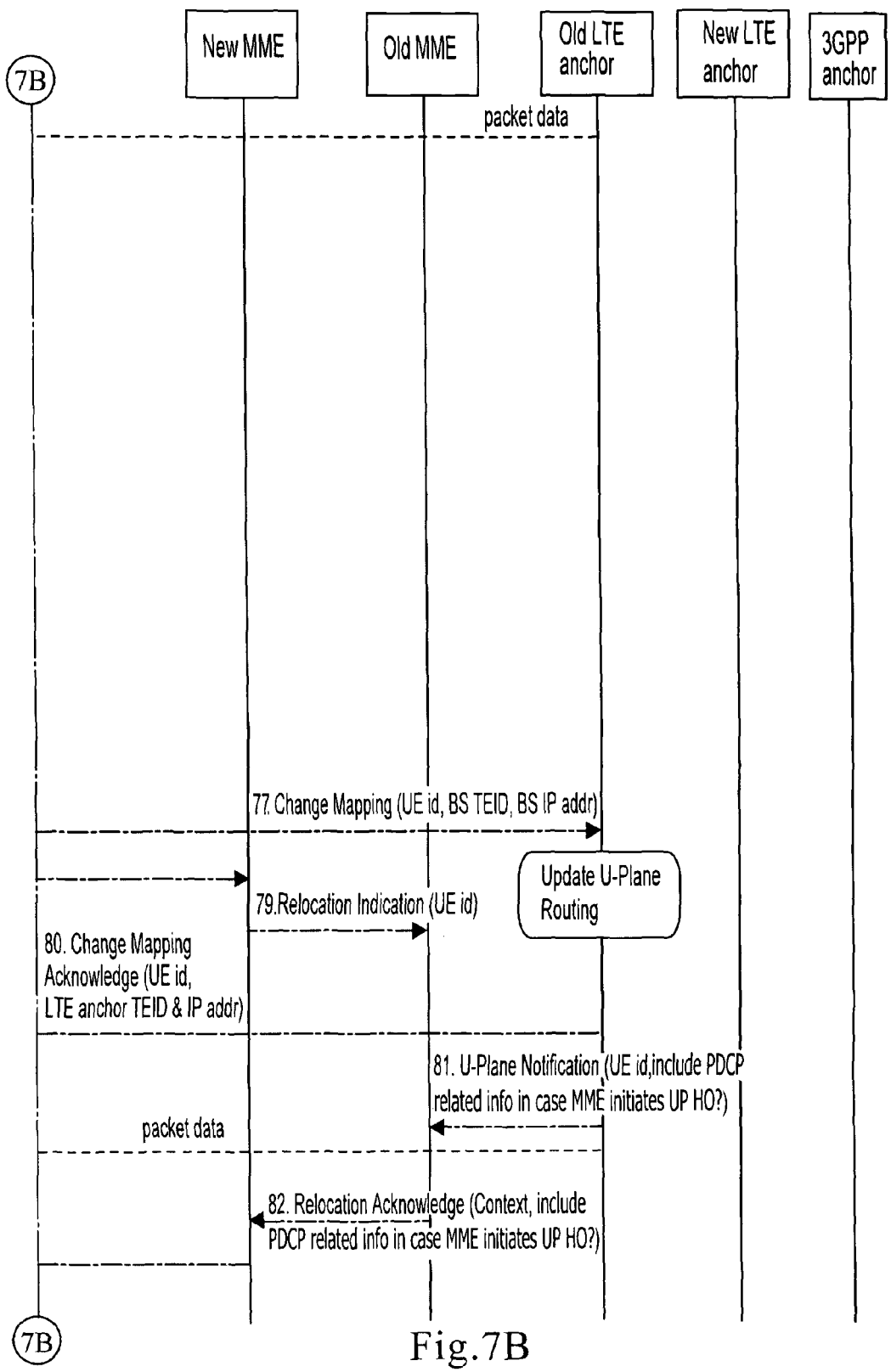

FIGS. 7A and 7B illustrate a flow chart of an exemplary embodiment of inter MME handover with additions to enable UPE equivalent to LTE anchor handovers. At Step 71, a measurement report is sent, and at Step 72, the context data message is sent, in similar fashion to the above discussed method. At Step 73, the context is confirmed and the handover command is sent, at Step 74. At Step 75, the handover confirm message is sent, and at Step 76, the handover is completed. At Step 77, the Target eNB sends a message to the old LTE anchor to change the mapping (UE ID, BS TEID, BS IP address, etc.) and the old LTE updates the user plane routing. At Step 78, the relocation indication (UE id) is sent from the Target eNb to the new MME and the relocation indication is sent form the new MME to the old MME, at Step 79. At Step 80, the old LTE anchor sends a change mapping acknowledge message to the Target eNB, and a user plane notification message to the old MME. The user plane notification message includes the user equipment ID and the PDCP related information incase the MME initiates uplink handover, that is, to get prepared to relocate the PDCP and ciphering point, which takes place at Step 81. At Step 82, the old MME sends a relocation acknowledge message to the new MME, and at Step 83, the new MME acknowledges relocation to the target eNB.

Figure 8:
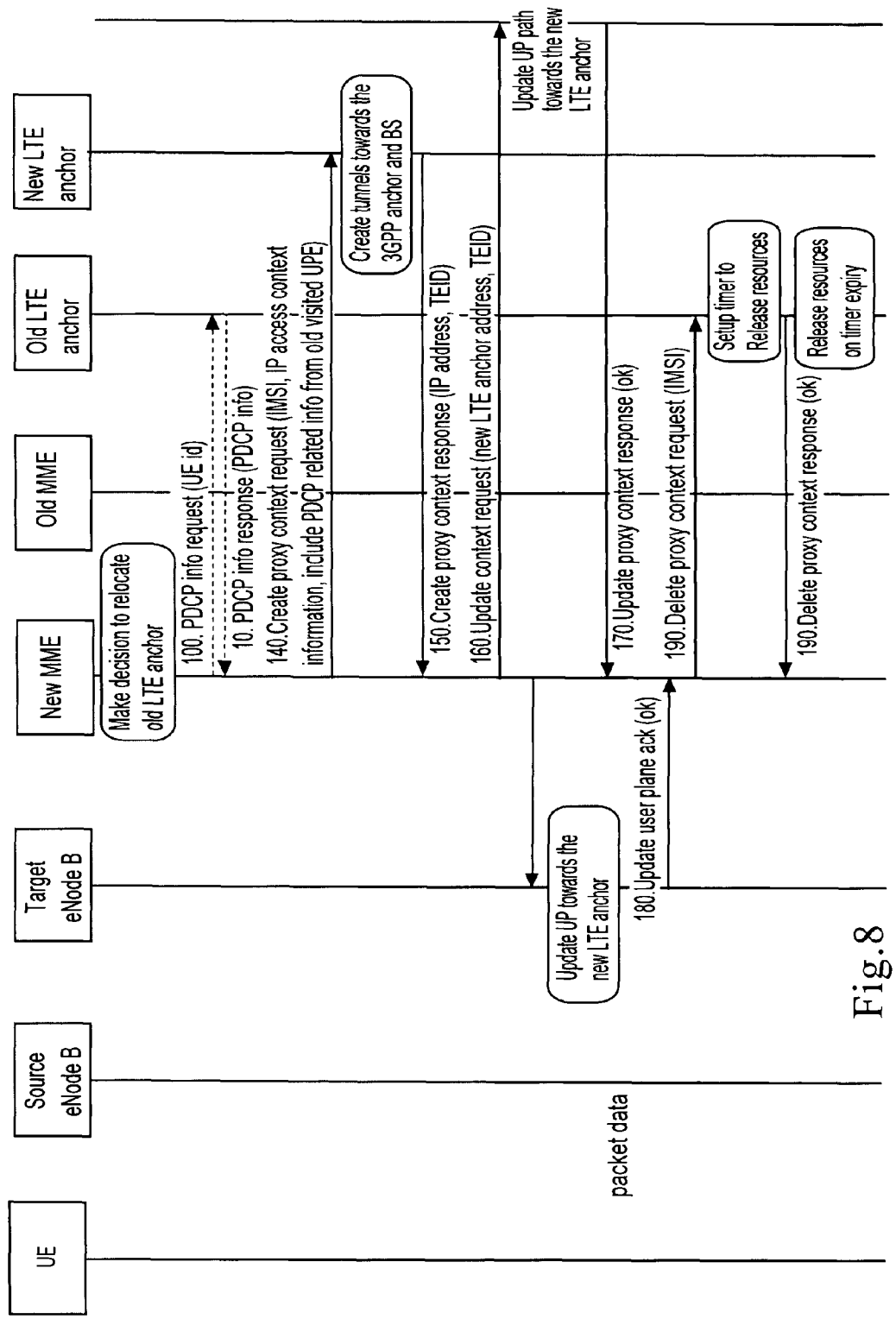
FIG. 8 illustrates a flow chart of an exemplary method of relocating visited UPE after an inter MME handoff.

FIG. 8 illustrates a flow chart of an exemplary embodiment of relocating visited UPE after an inter MME handoff. This embodiment continues from the previous embodiment and generally begins at Step 100, where the new MME sends a PDCP information request to the old LTE anchor and receives a response from the old LTE anchor. This messaging may be piggybacked onto other messaging between the two entities shown in previous figures. At Step 140, the new MME sends a create proxy request message to the new LTE anchor, which creates the required tunnels between the 3GPP anchor and the base station. The new LTE anchor responds with a create proxy context response at Step 150, and the new MME sends an update context response message to the 3GPP anchor, at Step 160. At generally the same time, the new MME also sends an update user plane indication to the target eNB to update towards the new LTE anchor. The 3GPP anchor updates uplink path towards the new LTE anchor and sends an update proxy context message to the new MME at Step 170. At Step 180, the target eNB acknowledges the user plane update, and at Step 190, the new MME sends a delete proxy context request to the old LTE anchor, which responds with an acknowledge message and releases the resources subject to a timer expiring.

Figure 9A:
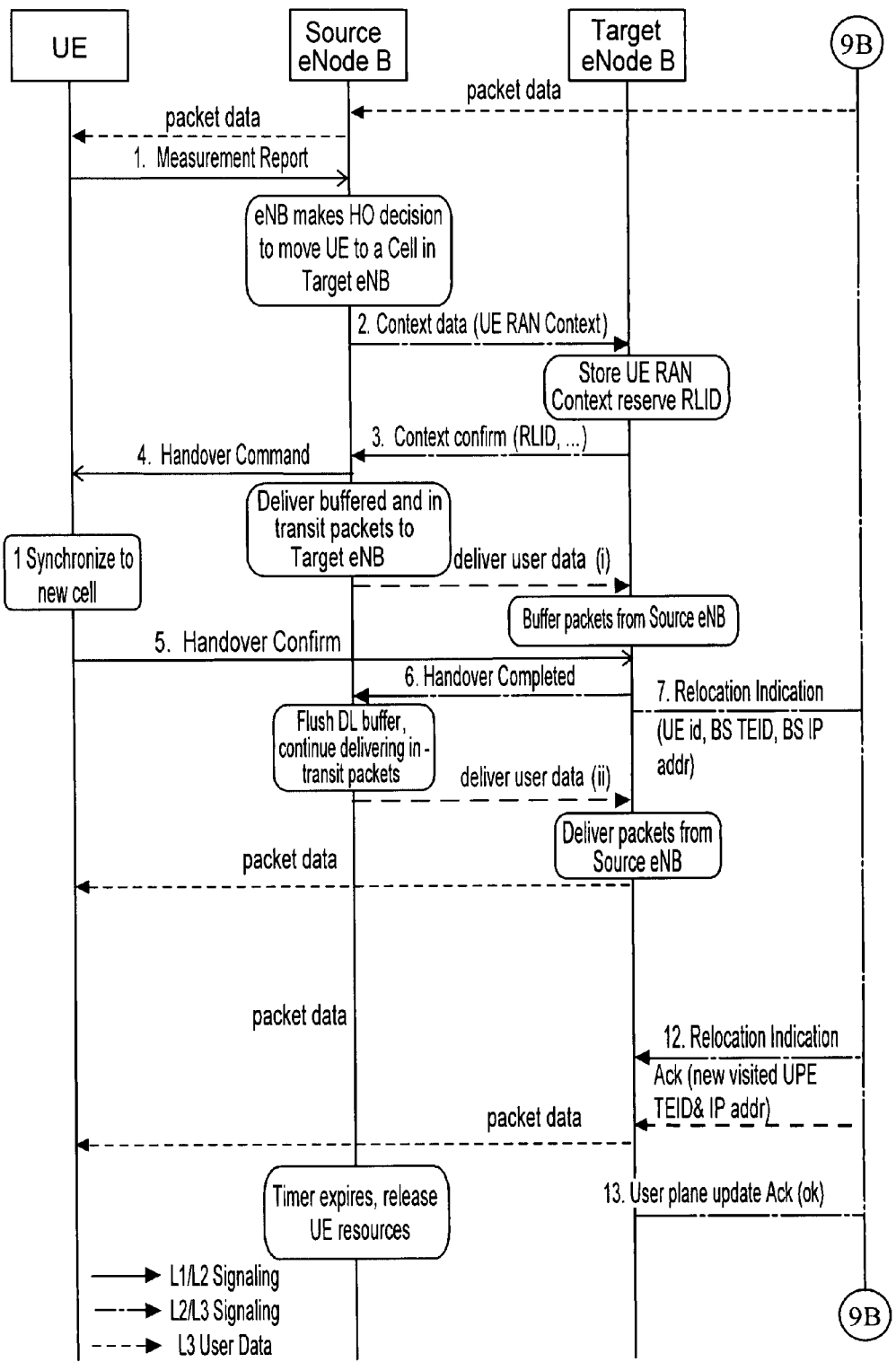
FIGS. 9A and 9B illustrate an alternative method for LTE anchor relocation.
Figure 9B:
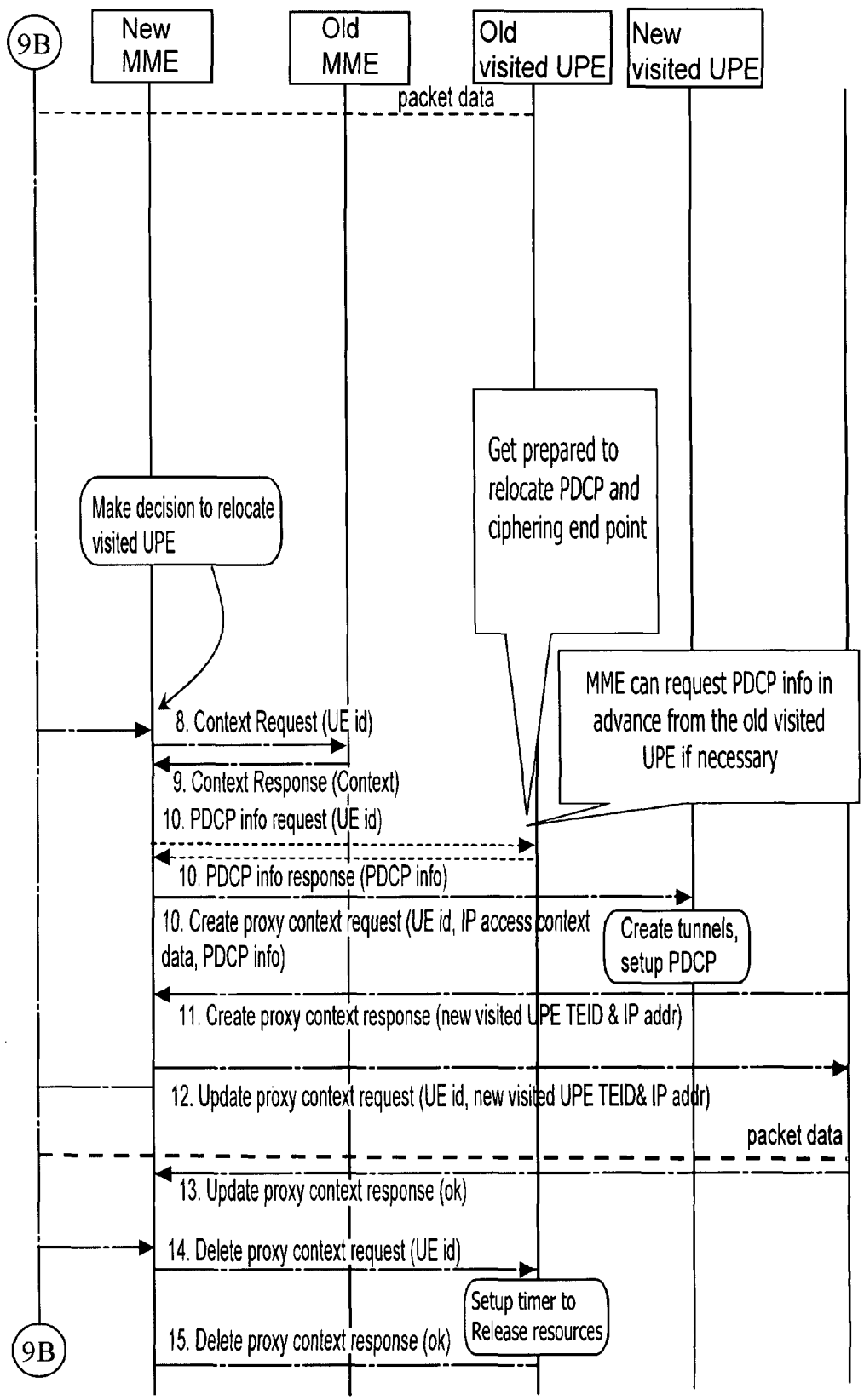
Figure 10A:
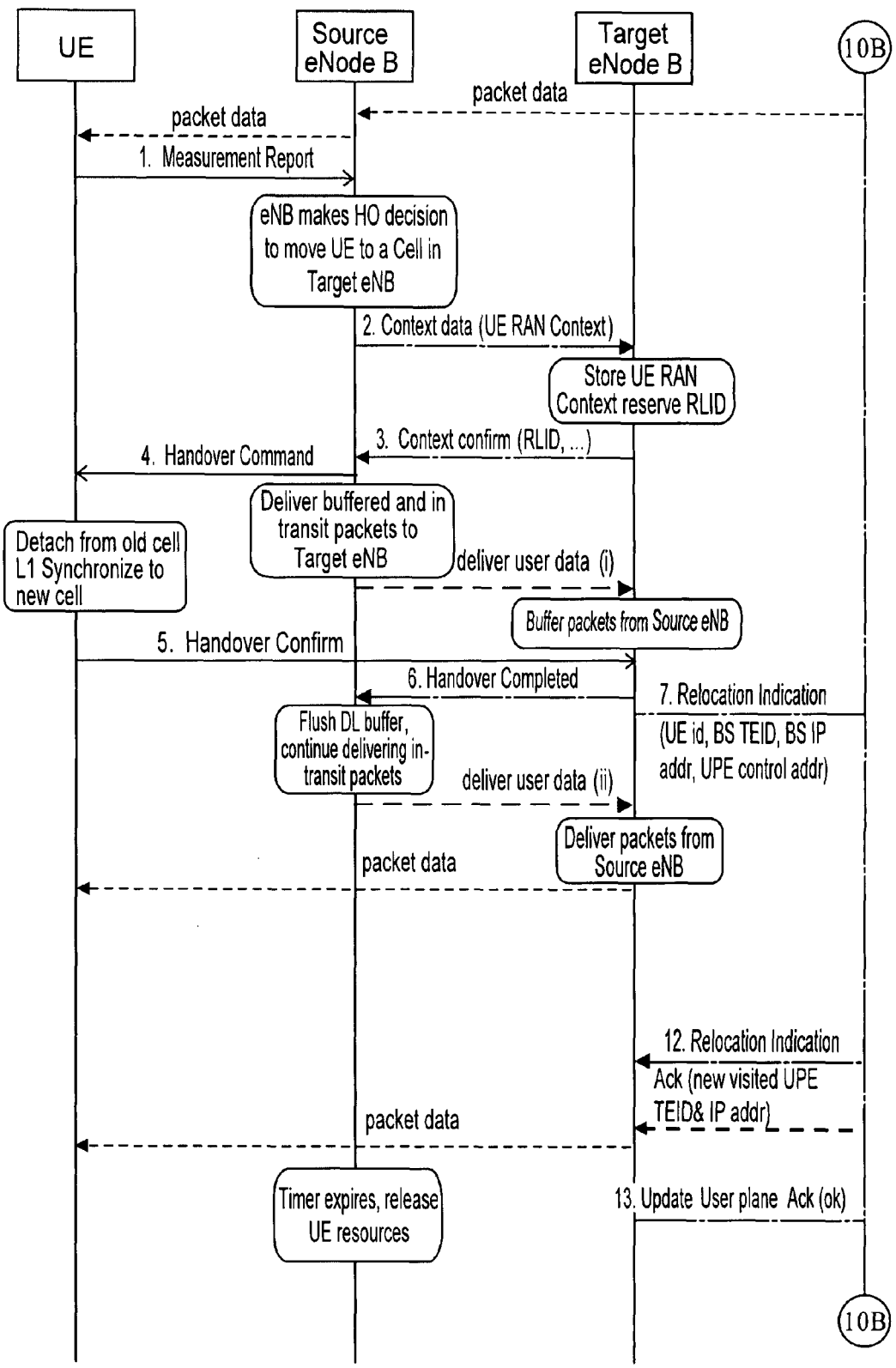
FIGS. 10A and 10B illustrate another alternative method for LTE anchor relocation.
Figure 10B:
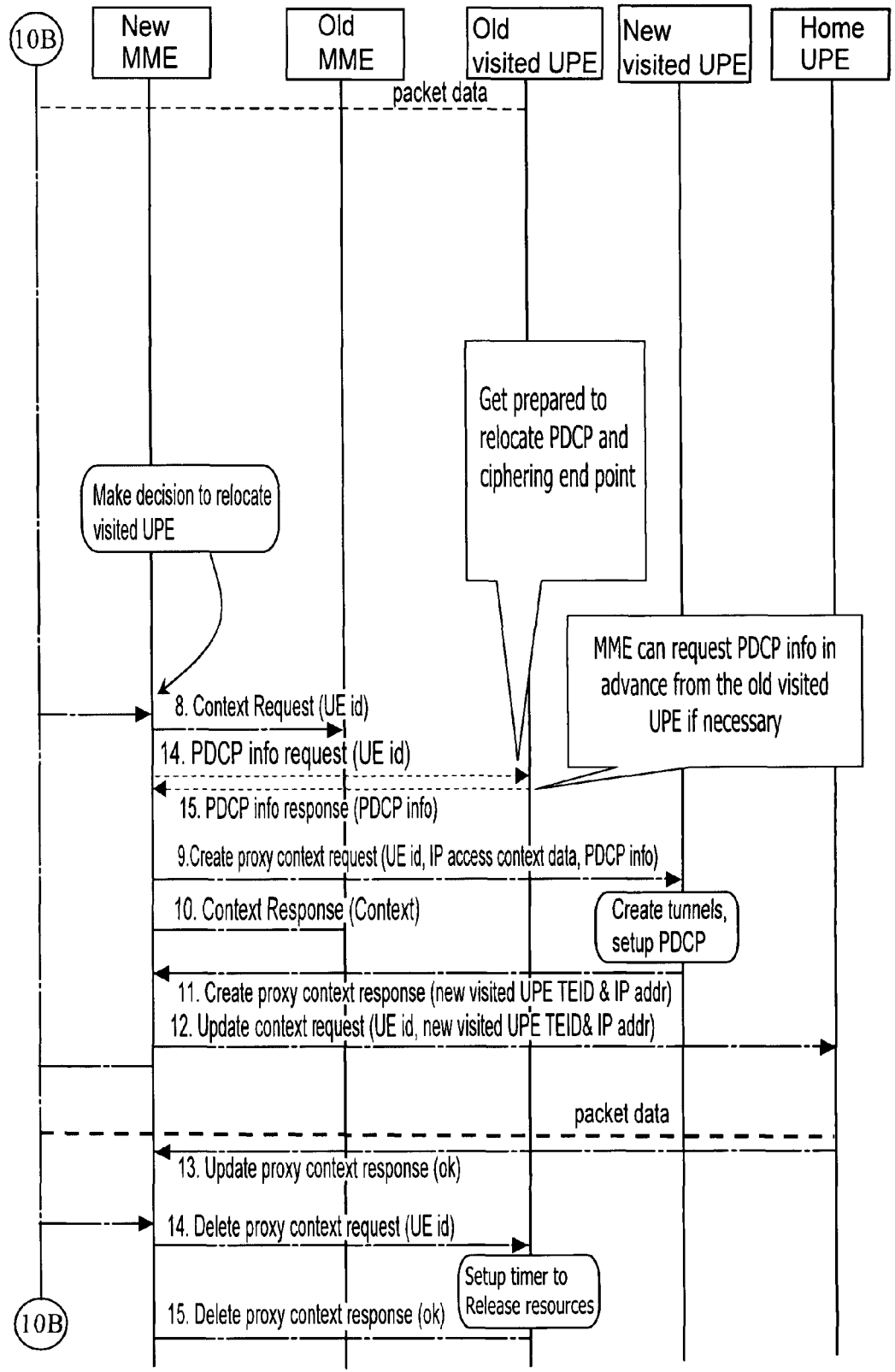

FIGS. 9A and 9B illustrate an alternative method for LTE anchor relocation, and FIGS. 10A and 10B illustrate another alternative method for LTE anchor relocation. The method illustrated in FIGS. 9A and 9B are configured to perform UPE (LTE anchor) relocation totally combined with MME. Although this method is effective, it may not be preferred, as the handover may be delayed. The method of FIGS. 10A and 10B are directed to the scenario where the visited UPE is relocated in case of roaming and the home services are used. Both of the methods illustrated in FIGS. 9A, 9B and FIGS. 10A and 10B are similar to the previously discussed methods, with minor changes to account for the different configurations and situations.

Figure 11:
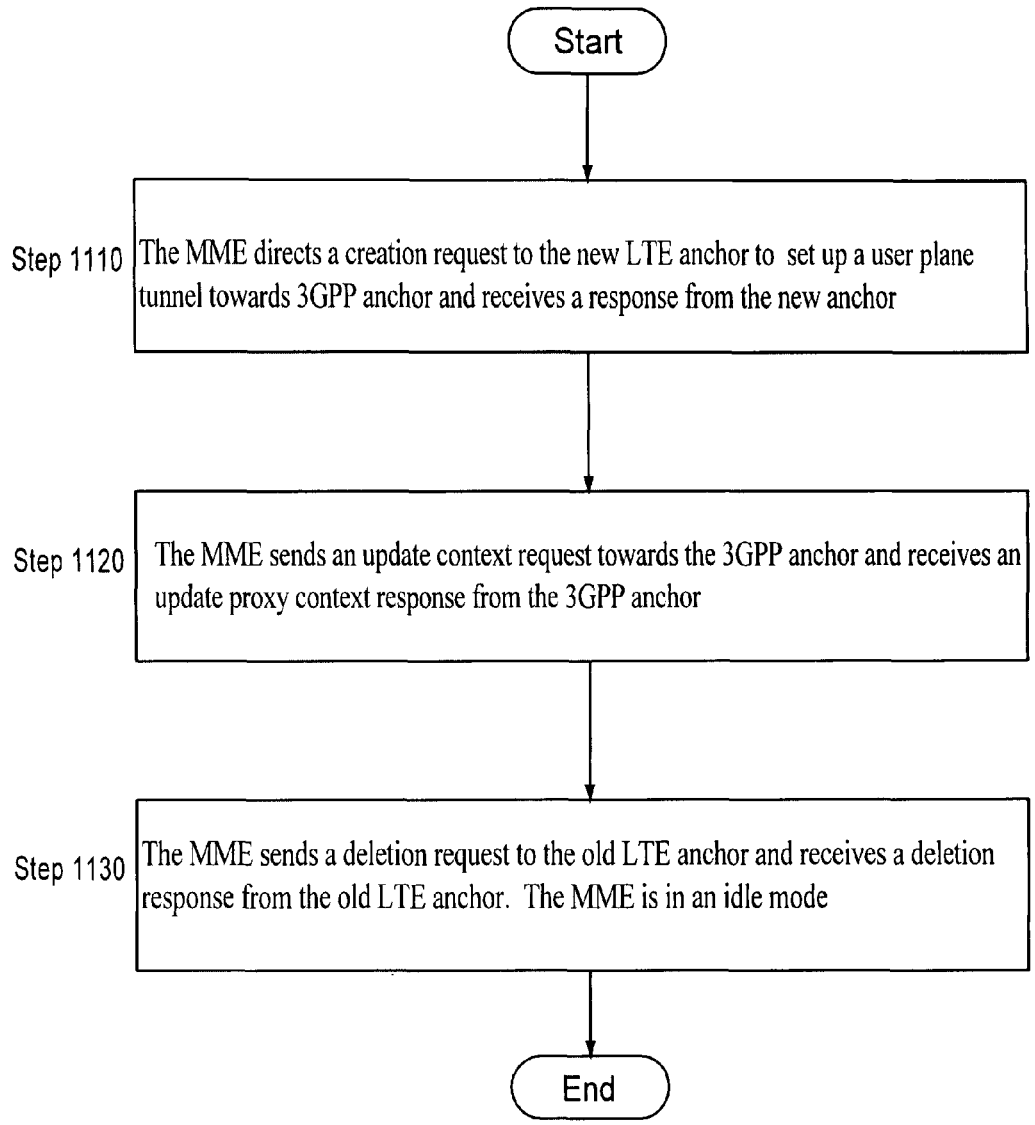
FIG. 11 illustrates the steps implemented in the MME for initiating an anchor change-over procedure

FIG. 11 illustrates the steps implemented in the MME for initiating an anchor change-over procedure. In Step 1110, the MME directs a creation request to the new LTE anchor to set up a user plane tunnel towards 3GPP anchor and receives a response from the second anchor. In Step 1120, the MME sends an update context request towards the 3GPP anchor and receives an update proxy context response from the 3GPP anchor. At Step 1130, the MME sends a deletion request to the old LTE anchor and receives a deletion response from the old LTE anchor. The MME is in an idle mode.

Therefore, embodiments of the invention generally provide a method for transferring an LTE anchor in an idle mode. The method includes an MME (control plane entity) initiating an LTE anchor change procedure, the MME first commands the selected new LTE anchor to set up a user plane tunnel towards the 3GPP anchor and then it updates this information towards the 3GPP anchor. Thereafter, the old tunnel is deleted from the old LTE anchor.

Other embodiments of the invention generally provide a method for transferring an LTE anchor in an idle mode, wherein the method includes a source base station forwarding downlink data toward the target base station, a radio link is established and the target base station sends data via the new radio link towards the user equipment, and the data path is updated from the target base station to the old LTE anchor and data flows (uplink and downlink) via the new radio link via the target base station. The method further includes the MME requesting the new LTE anchor to setup tunnels towards the 3GPP anchor and the target base station, the new LTE anchor starts receiving data, and the MME requests both target BS and 3GPP anchor to update data paths towards the new LTE anchor. The MME then requests that the old LTE anchor release communication resources after a timer expires.

It should be appreciated by one skilled in art, that the present invention may be utilized in any network where there is a changeover in the LTE anchors, as described above. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

What is claimed:

1. An apparatus comprising:
a processor configured to
 direct, by the apparatus comprising a mobility management entity, a creation request to a second anchor to set up a user plane tunnel towards a third anchor, the second anchor comprising a second gateway interfacing a second radio access network being a target to which a user equipment is to connect, the third anchor comprising a third gateway,
 receive, at the apparatus and in response to the creation request, a response from the second anchor, the response including a tunnel identifier for the user plane tunnel between the second anchor and the third anchor,
 send an update context request including the tunnel identifier towards the third anchor,
 receive, in response to the update context request, an update proxy context response from the third anchor, direct a deletion request to a first anchor, the first anchor comprising a first gateway interfacing a first radio access network from which the user equipment detaches, and receive a deletion response from the first anchor.

2. The apparatus of claim 1, wherein the first anchor is configured in accordance with a long term evolution standard, wherein the second anchor is configured in accordance with the long term evolution standard, and the third anchor is configured in accordance with a third generation partnership project standard.

3. The apparatus of claim 1, wherein the second anchor provides at least one of a termination of packet data convergence protocol, a termination of user plane ciphering, and a termination of user plane integrity.

4. The apparatus of claim 1, wherein the processor is further configured send a proxy context request to the second anchor.

5. The apparatus of claim 4, wherein the proxy context request includes a mobile station identifier and access context information.

6. The apparatus of claim 1, wherein the processor is further configured to receive a proxy context response comprising the second anchor address for user plane delivery and allocated tunnel endpoint identifiers.

7. The apparatus of claim 1, wherein the processor is further configured to send an update context request to the third anchor, wherein the update context request includes at least one address for the second anchor and tunnel endpoint identifiers received from the second anchor.

8. The apparatus of claim 1, wherein the processor is further configured to send a delete proxy context request to the first anchor to terminate operations with the first anchor, wherein the first anchor is configured to release resources to the third anchor.

9. A method comprising:
directing, by a network entity comprising a mobility management entity, a creation request to a second anchor to set up a user plane tunnel towards a third anchor, the second anchor comprising a second gateway interfacing a second radio access network being a target to which a user equipment is to connect, the third anchor comprising a third gateway;
receiving, in response to the creation request, a response from the second anchor the response including a tunnel identifier for the user plane tunnel between the second anchor and the third anchor;
sending an update context request including the tunnel identifier towards the third anchor;
receiving an update proxy context response from the third anchor;
directing a deletion request to a first anchor, the first anchor comprising a first gateway interfacing a first radio access network from which the user equipment detaches; and
receiving a deletion response from the first anchor.

10. The method of claim 9, wherein the directing of the creation request comprises using an external entity to decide when the second anchor is to be selected and using the external entity to select the second anchor.

11. The method of claim 9, wherein the directing of the creation request comprises sending a proxy context request to the second anchor, wherein the proxy context request includes a mobile station identifier and access context information.

12. The method of claim 9, wherein the receiving of the response from the second anchor comprises receiving a proxy context response comprising at least one address for the second anchor for user plane delivery and allocated tunnel endpoint identifiers.

13. The method of claim 9, wherein the updating comprises sending an update context request to the third anchor, wherein the update context request includes at least one address for the second anchor and tunnel endpoint identifiers received from the second anchor.

14. The method of claim 9, wherein the deleting comprises sending a delete proxy context request to the first anchor to terminate operations with the first anchor, wherein the first anchor is configured to release resources to the third anchor.

15. An apparatus, comprising:
directing means for directing by a mobility management entity, a creation request to a second anchor to set up a user plane tunnel towards a third anchor, the second anchor comprising a second gateway interfacing a second radio access network being a target to which a user equipment is to connect, the third anchor comprising a third gateway;
first receiving means for receiving, in response to the creation request, a response from the second anchor, the response including a tunnel identifier for the user plane tunnel between the second anchor and the third anchor;
updating means for sending an update context request including the tunnel identifier towards the third anchor;
second receiving means for receiving an update proxy context response from the third anchor;
directing means for directing a deletion request to a first anchor comprising a first gateway interfacing a first radio access network from which the user equipment detaches; and
third receiving means for receiving a deletion response from the first anchor.

16. A system, comprising:
a processor, at a mobility management entity, configured to direct a creation request to a second anchor to set up a user plane tunnel towards a third anchor, the second anchor comprising a second gateway interfacing a second radio access network being a target to which a user equipment is to connect, wherein
the second anchor is configured to create, in response to the creation request, a tunnel towards the third anchor upon receipt of the creation request and to send a response to the processor, the response including a tunnel identifier for the user plane tunnel between the second anchor and the third anchor,
upon receipt of the response from the second anchor the processor is configured to update a context request including the tunnel identifier towards the third anchor,
the third anchor is configured to update uplink path toward the second anchor and to send an update proxy context response to the processor,
the processor is configured to directing a deletion request to a first anchor comprising a first gateway interfacing a first radio access network from which the user equipment detaches.

17. A non-transitory computer-readable storage medium including a computer program which when executed by a processor provides a process, the process comprising:
directing, by a network entity comprising a mobility management entity, a creation request to a second anchor to set up a user plane tunnel towards a third anchor, the second anchor comprising a second gateway interfacing a second radio access network being a target to which a user equipment is to connect, the third anchor comprising a third gateway;

receiving, in response to the creation request, a response from the second anchor, the response including a tunnel identifier for the user plane tunnel between the second anchor and the third anchor;

sending an update context request including the tunnel identifier towards the third anchor;

receiving an update proxy context response from the third anchor;

directing a deletion request to a first anchor, the first anchor comprising a first gateway interfacing a first radio access network from which the user equipment detaches; and receiving a deletion response from the first anchor.

18. The computer-readable medium of claim 17, wherein the directing of the creation request comprises using an external entity to decide when the second anchor is to be selected and using the external entity to select the second anchor.

19. The computer-readable medium of claim 17, wherein the directing of the creation request comprises sending a proxy context request to the second anchor, wherein the proxy context request includes a mobile station identifier and access context information.

20. The computer-readable medium of claim 17, wherein the receiving of the response from the second anchor comprises receiving a proxy context response comprising at least one address for the second anchor for user plane delivery and allocated tunnel endpoint identifiers.

21. The computer-readable medium of claim 17, wherein the updating comprises sending an update context request to the third anchor, wherein the update context request includes at least one address for the second anchor and tunnel endpoint identifiers received from the second anchor.

22. The computer-readable medium of claim 17, wherein the deleting comprises sending a delete proxy context request to the first anchor to terminate operations with the first anchor, wherein the first anchor is configured to release resources to the third anchor.

* * * * *